| (12) | United States Patent<br>Simmons et al. | (10) Patent No.: US 7,454,702 B2<br>(45) Date of Patent: Nov. 18, 2008 |
|---|---|---|

| (54) | TOOL FOR SELECTING INK AND OTHER OBJECTS IN AN ELECTRONIC DOCUMENT |
|---|---|
| (75) | Inventors: Alex J. Simmons, Redmond, WA (US); Ian C. McGraw, Stanford, CA (US); Peter L. Engrav, Seattle, WA (US); Benoit Barabe, Snoqualmie, WA (US); Owen C. Braun, Seattle, WA (US) |
| (73) | Assignee: Microsoft Corporation, Redmond, WA (US) |
| ( * ) | Notice: Subject to any disclaimer, the term of this patent is extended or adjusted under 35 U.S.C. 154(b) by 538 days. |
| (21) | Appl. No.: 11/085,735 |
| (22) | Filed: Mar. 21, 2005 |
| (65) | Prior Publication Data<br>US 2006/0212812 A1 Sep. 21, 2006 |
| (51) | Int. Cl.<br>G06F 15/00 (2006.01) |
| (52) | U.S. Cl. .................. 715/272; 715/263; 715/268; 715/860; 715/863; 715/864 |
| (58) | Field of Classification Search .................. 715/500, 715/531, 767, 859–860, 863–865, 200, 255–256, 715/262–263, 268<br>See application file for complete search history. |

(56) References Cited

U.S. PATENT DOCUMENTS

| 6,842,175 | B1 * | 1/2005 | Schmalstieg et al. | ......... 345/427 |
|---|---|---|---|---|
| 7,324,085 | B2 * | 1/2008 | Balakrishnan et al. | ...... 345/157 |
| 2004/0021701 | A1 * | 2/2004 | Iwema et al. | ............... 345/863 |
| 2005/0111014 | A1 * | 5/2005 | Lui et al. | ..................... 358/1.1 |
| 2007/0057930 | A1 * | 3/2007 | Iwema et al. | ............... 345/179 |

* cited by examiner

Primary Examiner—Cesar B Paula
(74) Attorney, Agent, or Firm—Merchant & Gould (57) ABSTRACT

A note-taking application is provided which includes a free-form selection tool. In certain embodiments, a particular selection may be based in part on the speed or velocity of a user selection. The free-form selection tool is configured to provide more or less precise selections based in part on the speed of a selection. The free-form selection tool is further operable to recognize when a user is attempting to retry a selection.

16 Claims, 10 Drawing Sheets

TOOL FOR SELECTING INK AND OTHER OBJECTS IN AN ELECTRONIC DOCUMENT

BACKGROUND OF THE INVENTION

Free-form document editors can be utilized in electronic tablets and other computing devices. A free-form document editor is operable to record handwriting and other free-form input, such as note-taking input, for example. Electronic tablets typically include a screen and a handheld device that is similar to a pen (also referred to as a stylus). A user can use the pen to write on the electronic tablet in a manner similar to the use of traditional pen and paper. The electronic tablet can "read" the strokes of the user's handwriting with the handheld device and render the handwriting in electronic form on the tablet's screen and/or the computer's display as "electronic ink".

Some free-form document editors allow the input of digital text and other digital objects (pictures, images, etc.) as well. ONENOTE 2003 provides a single place to electronically capture and organize typed and handwritten notes, audio recordings, graphics, and other rich media. However, free-form document editors are limited as to how electronic ink, digital text, and other digital objects are selected and manipulated, individually or as one or more groups within a file. For example, certain free-form document editors only allow range space selection or even marquis-style selection using a pen. Additionally, users would prefer a more natural experience when using a pen to select electronic ink, digital text, and other digital objects.

It is with respect to these considerations and others that the various embodiments of the present invention have been made.

SUMMARY OF THE INVENTION

The present invention provides a method, computer-readable medium, and a system for selecting one or more elements of an electronic document. The elements may include ink, text, pictures, and other objects. According to the invention, a note-taking application is provided which includes a free-form selection tool. In certain embodiments, a particular selection using the tool may be based in part on the speed or velocity of a user selection. The free-form selection tool is configured to provide more or less precise selections based in part on the speed of a selection. The free-form selection tool is further operable to recognize when a user is attempting to retry a particular selection.

The invention may be implemented as a computer process or method, a computing apparatus, or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

DETAILED DESCRIPTION OF PREFERRED EMBODIMENTS

Exemplary embodiments of the present invention provide a note-taking application which includes a free-form selection tool. In certain embodiments, a particular selection using the tool may be based in part on the speed or velocity of a user selection. The free-form selection tool can be configured to provide more or less precise selections based on the speed of a selection. The free-form selection tool is also operable to recognize when a user is attempting to retry a particular selection.

Exemplary Operating Environment

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
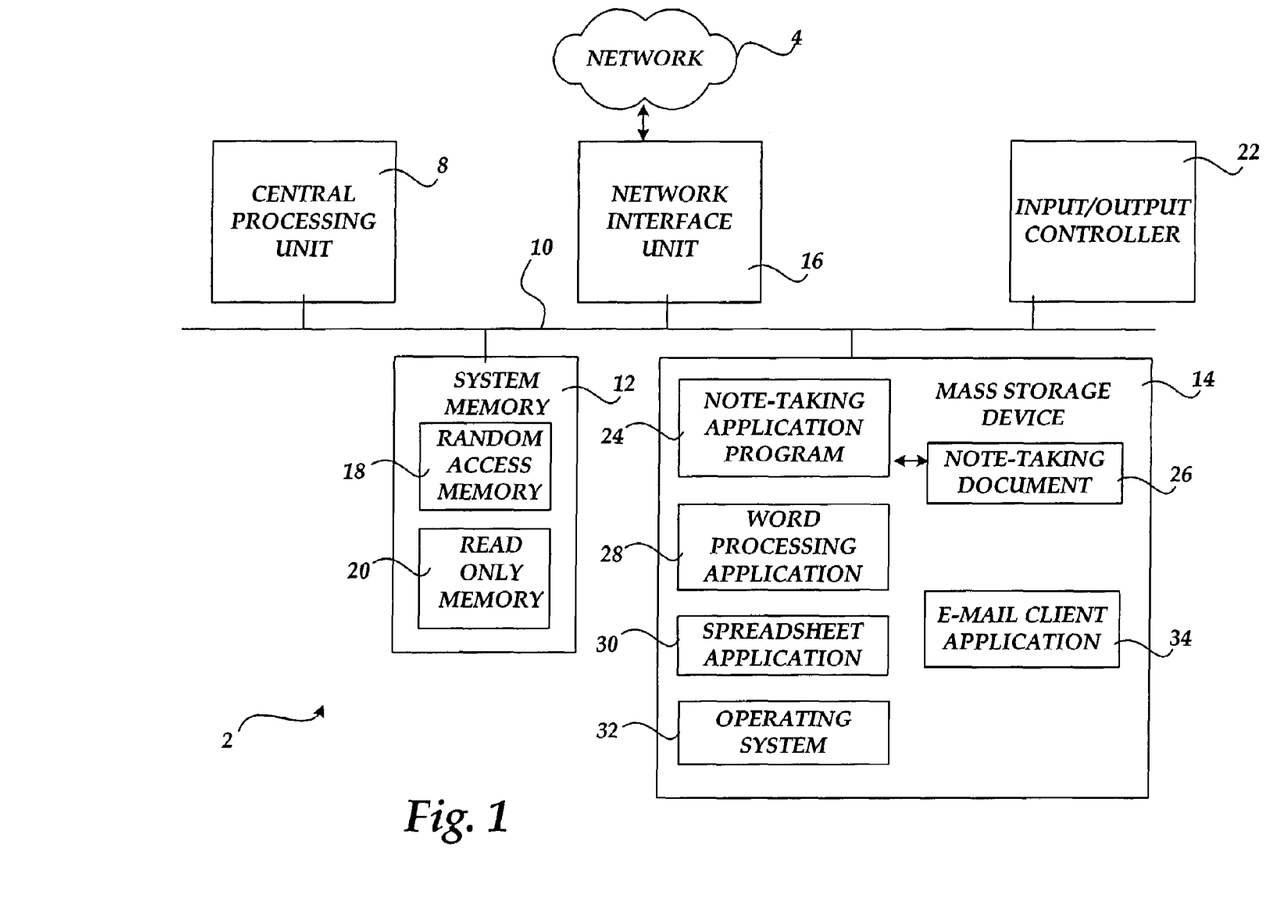
FIG. 1 is a block diagram illustrating an exemplary computing environment for implementation of various embodiments of the present invention.

Referring now to FIG. 1, an illustrative operating environment for embodiments of the invention will be described. As shown in FIG. 1, computer 2 comprises a general purpose desktop, laptop, tablet, or other type of computer capable of executing one or more application programs. In particular, according to the various embodiments of the invention, the computer 2 is operative to execute a note-taking application 24. As known to those skilled in the art, a note-taking application program 24 provides functionality for many features including capturing and organizing notes, which may include text, handwriting, pictures, drawings, audio, or other information.

According to one embodiment of the invention, the note-taking application 24 comprises the ONENOTE note-taking application program from MICROSOFT CORPORATION of Redmond, Wash. It should be appreciated, however, that the various aspects of the invention described herein may be utilized with other note-taking applications and other related programs from various manufacturers. Moreover, although the inventive aspects described herein are presented in the context of a note-taking application program, it should be appreciated that other types of application programs may also be utilized to embody the various aspects of the invention.

FIG. 1 depicts an illustrative computer architecture for a computer 2 utilized in various embodiments of the invention. The computer architecture illustrates a conventional desktop, laptop, or tablet computer, including a central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20. The computer 2 further includes a mass storage device 14 for storing an operating system 32, application programs, and other program modules, which will be described in greater detail below.

The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a TCP/IP network 4, such as the Internet. The computer 2 may connect to the network 4 through a network interface unit 16 connected to the bus 10. It should be appreciated that the network interface unit 16 may also be utilized to connect to other types of networks and remote computer systems. The computer 2 may also include an input/output controller 22 for receiving and processing input from a number of other devices, including a keyboard, mouse, or electronic stylus or pen (not shown in FIG. 1). Similarly, an input/output controller 22 may provide output to a display screen, a printer, or other type of output device.

As mentioned briefly above, a number of program modules and data files may be stored in the mass storage device 14 and RAM 18 of the computer 2, including an operating system 32 suitable for controlling the operation of a networked personal computer, such as the WINDOWS XP operating system from MICROSOFT CORPORATION of Redmond, Wash. The mass storage device 14 and RAM 18 may also store one or more program modules. In particular, the mass storage device 14 and the RAM 18 may store a note-taking application program 24, as described above, and other application programs, such as a word processing application 28, a spreadsheet application 30, e-mail application 34, etc. As briefly described above, the note-taking application 24 can comprise an application program for capturing and organizing notes, which may include text, handwriting, pictures, drawings, audio, or other information.

Notes may be created, modified, saved, and organized by the note-taking application 24 into notebooks, folders, pages, and sections. Within a page, notes may be entered anywhere and later repositioned. Moreover, emphasis may be added to notes with bullet and list styles as wells as flags and highlighting. A user has full control over fonts, styles, sizes, and colors. When a user exits the note-taking application 24, the contents of the notebook may be saved in a note-taking document 26 on the mass storage device 14. Additional details regarding the operation of the ONENOTE note-taking application program are publicly available from MICROSOFT CORPORATION of Redmond, Wash.

Figure 2:
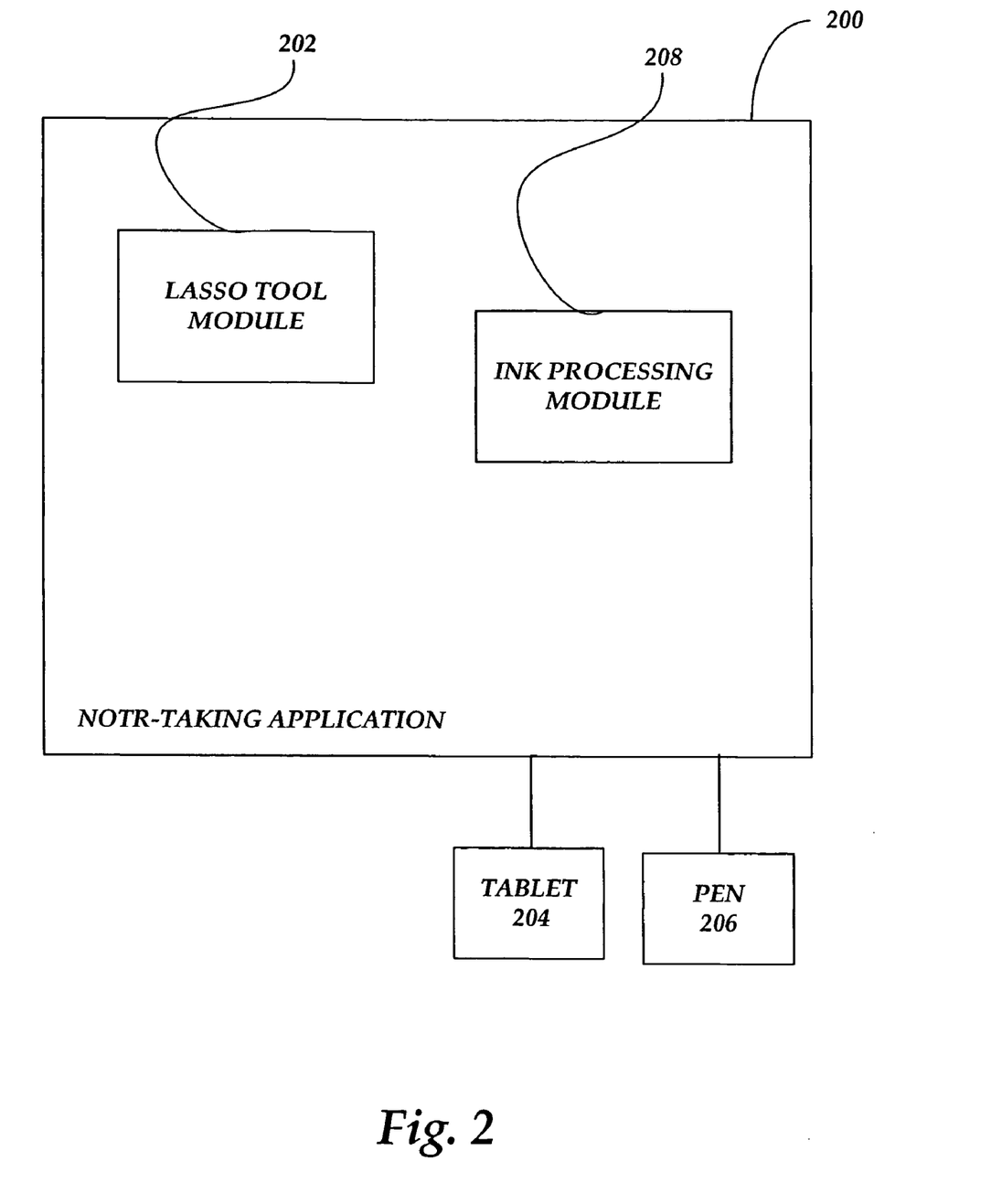
FIG. 2 depicts a block diagram of a note-taking application according to an embodiment of the invention.

FIG. 2 depicts a block diagram of a note-taking application 200. Preferably, the note-taking application 200 includes a lasso tool module 202. The lasso tool module 202 includes functionality which enables a user to select one or more elements in a note-taking document or file. As described below, the lasso tool module 202 preferably includes algorithms that provide feedback and control to a user when using the lasso tool. In certain embodiments, a tablet 204 and pen 206 can be used to input handwriting strokes which can be converted to data, referred herein as "ink" or "inking". The ink may be incorporated into a document and displayed or printed via an output device, such as the tablet 204, monitor, or some other display device. An ink-processing module 208 is operable to receive data from the electronic tablet 204 or pen 206 and to render the data as ink.

Figure 3:
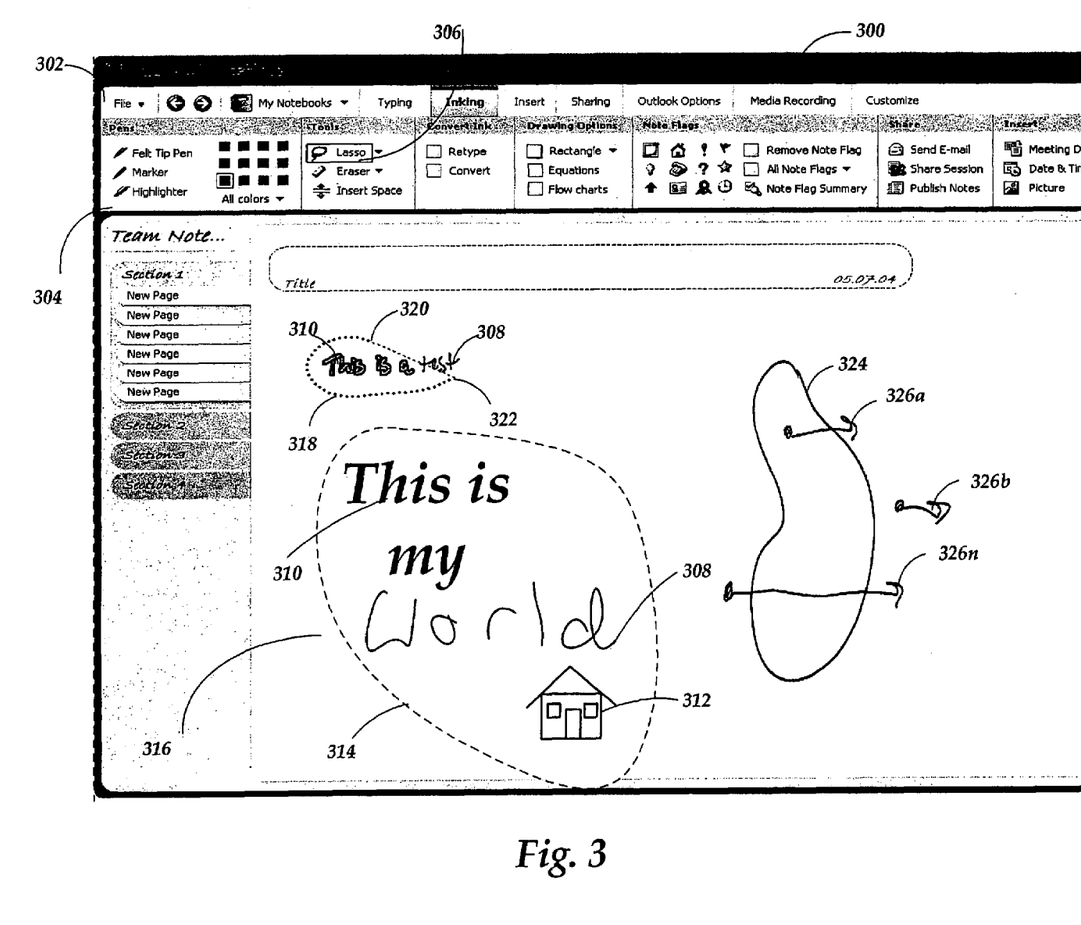
FIG. 3 is a screen shot from a note-taking application illustrating aspects of the invention.

Referring now to FIG. 3, an embodiment of a note-taking application 300 is shown. The note-taking application 300 includes a user interface 302 including various tools 304 organized within the user interface 302. According to embodiments of the invention, the note-taking application 300 preferably includes a lasso tool 306. The lasso tool 306 can be implemented as part of a drop-down menu, soft-key, or as a button, selectable by a mouse, pen, or other pointing or selecting device. It will be appreciated that the particular interface for availing the lasso tool 306 may be designed and/or implemented according in many ways, and the invention is not intended to limited to any particular embodiments or examples discussed herein.

The lasso tool 306 allows a user to select ink 308, text 310, drawings 312, images and/or other objects, hereinafter referred to collectively as "elements" 314 of the note taking application 300. The lasso tool 306 enables a user to naturally select and manipulate one or elements 314 of a document 316 using a pen, for example. As shown in FIG. 3, the lasso tool 306 has been used to "lasso" or select "This is a" and "test" portions of the ink 308. The lasso tool 306 automatically completed (the linear connector) the lasso 318 based on the user's lasso selection start point 320 and end point 322, selecting the lassoed elements 314. It will be appreciated that, depending on one or more user selections, there may be multiple user starting and ending selections.

The lasso tool 306 of note-taking application 300 preferably includes a lasso selecting algorithm which tends to improve a user experience when selecting elements 314 using the lasso tool 306. For example, as shown in FIG. 3, a user used the lasso tool 306 to form lasso 324. Points 326a-c represent select portions or points of elements 314 in the document or file 316.

Figure 4:
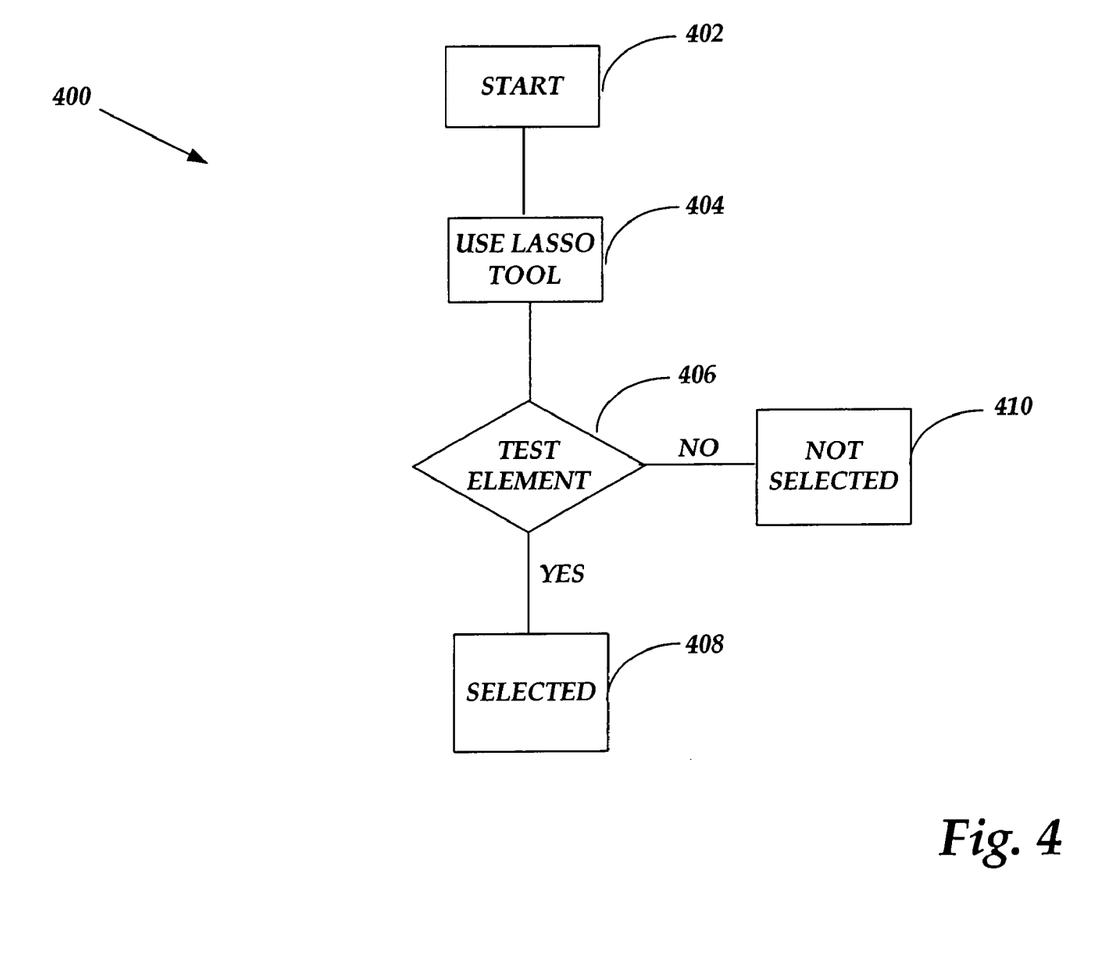
FIG. 4 is a flow diagram illustrating an embodiment of the invention.

With additional reference to FIG. 4, an embodiment of a lasso selecting algorithm 400 is described. The lasso selecting algorithm 400 starts at 402. At 404, a user uses the lasso tool 306 to select one or more elements 314 of a document 316. The lasso selecting algorithm 400 operates to test select points of elements 314 that are inside of a lasso, such as lasso 324 shown in FIG. 3, to determine if the tested points and/or objects satisfy certain criteria. For example, each ink stroke contains a number if such "points" and the lasso selecting algorithm 400 preferably operates on one or more points, independently or collectively in the analysis. Non-ink objects are preferably represented by a grid of points, some or all of which are measured against the lasso selecting algorithm 400 based on a particular implementation.

At 406, the lasso selecting algorithm 400 determines whether an element 314 has been selected by creating one or more imaginary horizontal rays 326a-n (where n is an integer number), from a point or points inside of the particular element 314. For this embodiment, the lasso selecting algorithm 400 uses horizontal, left to right presented rays 326a-n as part of its analysis. However, it will be appreciated that right to left, vertical, diagonal and other ray orientations and manipulations may be used as part of a lasso selecting algorithm 400. At 408, if the ray crosses the lasso 324 an odd number of times, one or more elements 314 are considered selected.

If the ray crosses the lasso 324 an even number of times (including zero times), the one or more elements 314 are not considered selected. A point on the lasso 324 is preferably considered inside of the lasso 324. Accordingly, the lasso tool 306 may be used to unselect an element by making a lasso more complicated. Additionally, the lasso selecting algorithm 400 tends to prevent random and unwanted selection of elements 314. The lasso selecting algorithm 400 also tends to provide the capability for a user to reselect an element even if it was previously unselected. According to the invention, the lasso tool 306 provides the flexibility for a user to lasso elements one or more times, or re-lasso parts of an element 314 already lassoed. Thus, a user can be very precise about what to select and what not to select when using the lasso tool 306.

Figure 5:
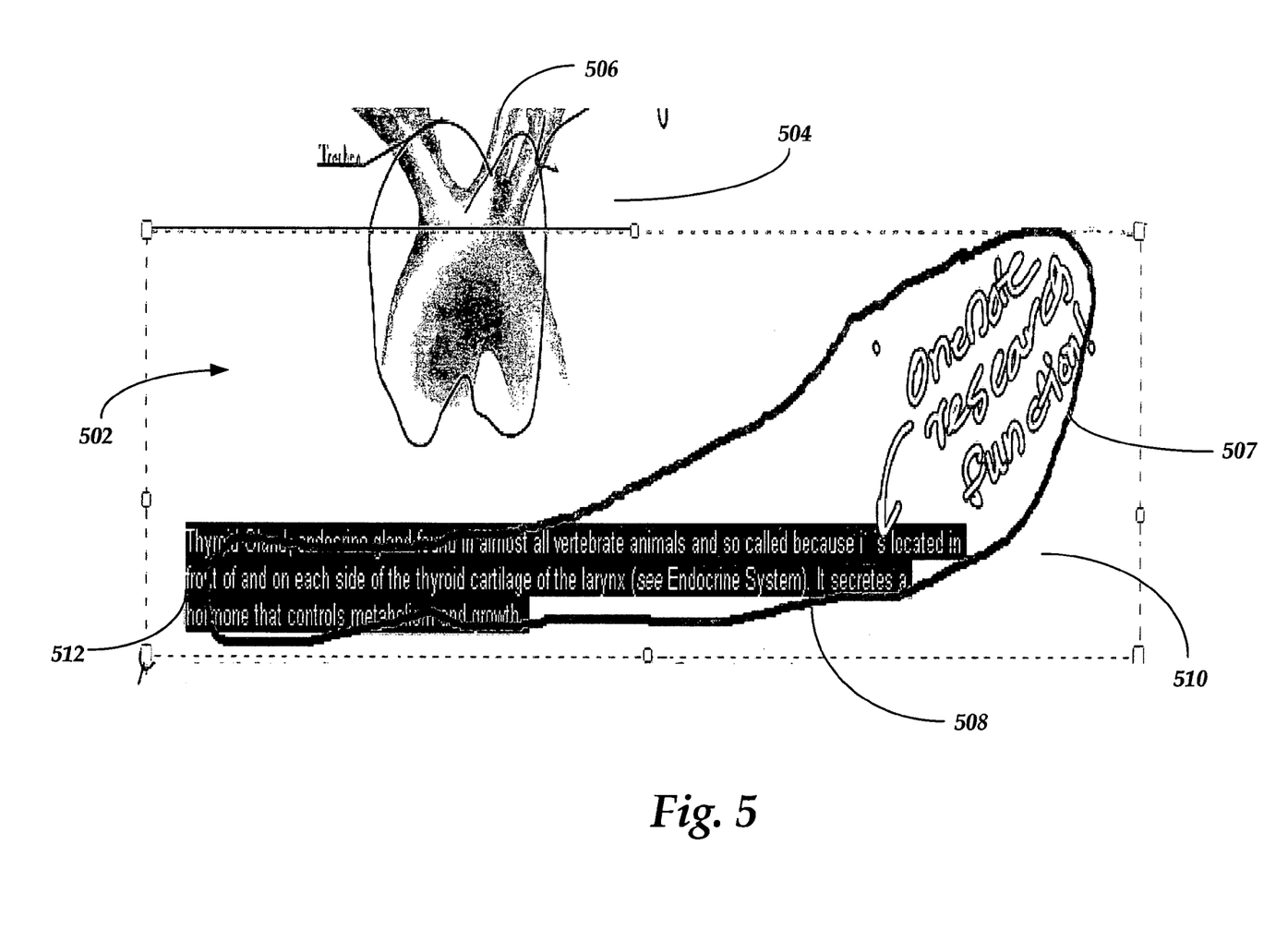
FIG. 5 is a screen shot from a note-taking application illustrating aspects of the invention.
Figure 6:
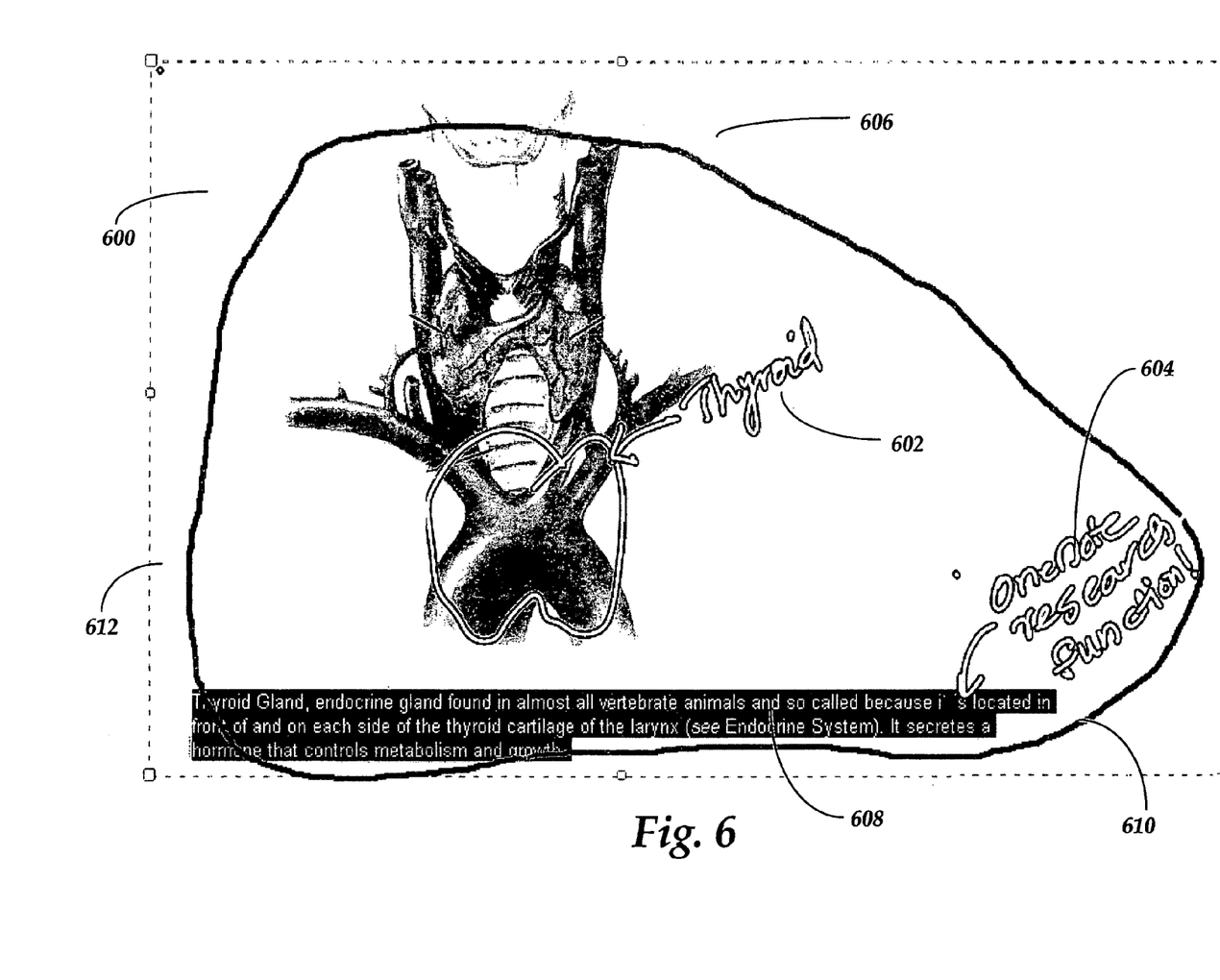
FIG. 6 is a screen shot from a note-taking application illustrating aspects of the invention.
Figure 7:
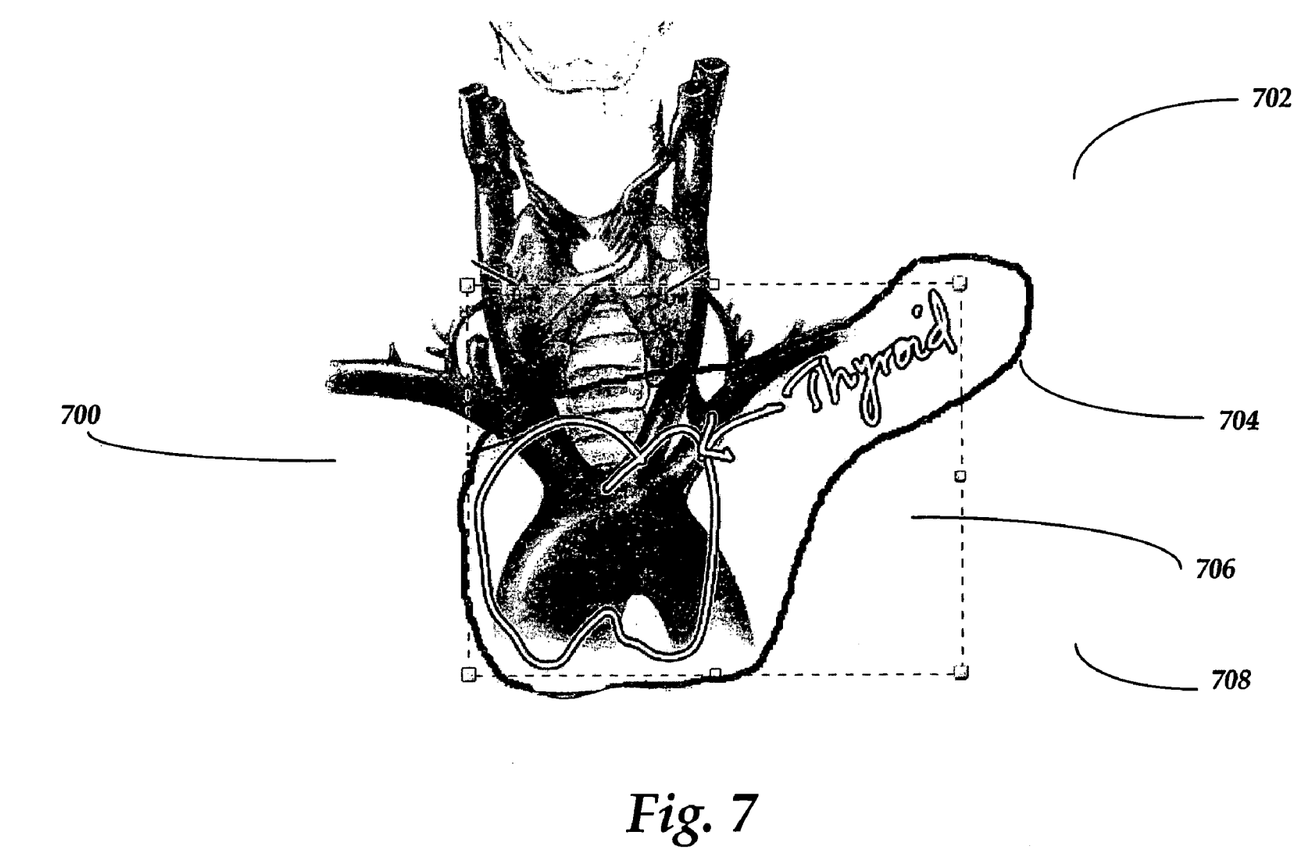
FIG. 7 is a screen shot from a note-taking application illustrating aspects of the invention.

Referring now to FIGS. 5-7, other features of the lasso tool 306 are described. FIG. 5 depicts a document 502 which includes a picture 504, ink 506 and 507, and text 508. A user, using the lasso tool 306, formed a lasso around elements of the document 502. A user begins using the lasso tool 306 by clicking on the representative button in the toolbar, for example. Once selected, the note-taking application provides an audible or visual indicator, such as a lasso symbol for example, which informs the user that the lasso tool 306 is enabled and ready to make selections.

The user begins a lasso selection by clicking a selection point in the document, such as document 316. The user continues the selection, by using the pen to partially or fully circumnavigate select elements of a document 316. The user completes the selection by releasing the lasso, using a barrel click for example, to define an end point of the selection. Based on the selection, the lasso tool module 202 uses one or more thresholds, such as those represented in Tables 1 and 2 below for example, to lasso select elements of a document 316.

As described briefly above, it is also possible to make multiple selections using the lasso tool 306. As shown in FIG. 5, a user has used the lasso tool 306 to form lasso 510. The dotted line represents a selection container 512 which encompasses selected elements based on the user's lasso 510. Based on the selection container 512, the user can operate on the selected elements as a unit. For example, the user can re-size or move the selected elements within the selection container 512 as a group. As shown in FIG. 5, container 512 includes as selected elements text 508 and ink 507. According to a preferred embodiment, the selected elements are highlighted to thereby inform the user of the current selection based on the lasso 510.

FIG. 6 depicts another example of a document 600 which includes ink 602 and 604, a picture 606, and text 608. A user, using the lasso tool 306, has formed lasso 610 to select ink 602 and 604, a picture 606, and text 608, defining selection container 612. FIG. 7 depicts an example wherein a document 700 includes a picture 702 and ink 704. A user, using the lasso tool 306, has formed lasso 706 to select ink 704 and a portion of picture 702, defining selection container 708. As described herein, according to embodiments of the invention, and in addition to other elements, the lasso tool 306 can be used to select a single text word, single text line, single text read-only and write paragraphs.

According to the invention, the lasso tool 306 provides a means for a user to ignore ink handles and other structure to particularly select and grab ink and other objects. Additionally, when using a tablet, users feel more natural making selections with the lasso tool 306, a pen friendly tool. "Chunk out" or "chunk up" as used herein refers to the expansion of a selection from a smallest selectable unit, a stroke for example, to a larger unit, such as a word, paragraph, etc.

Figure 8:
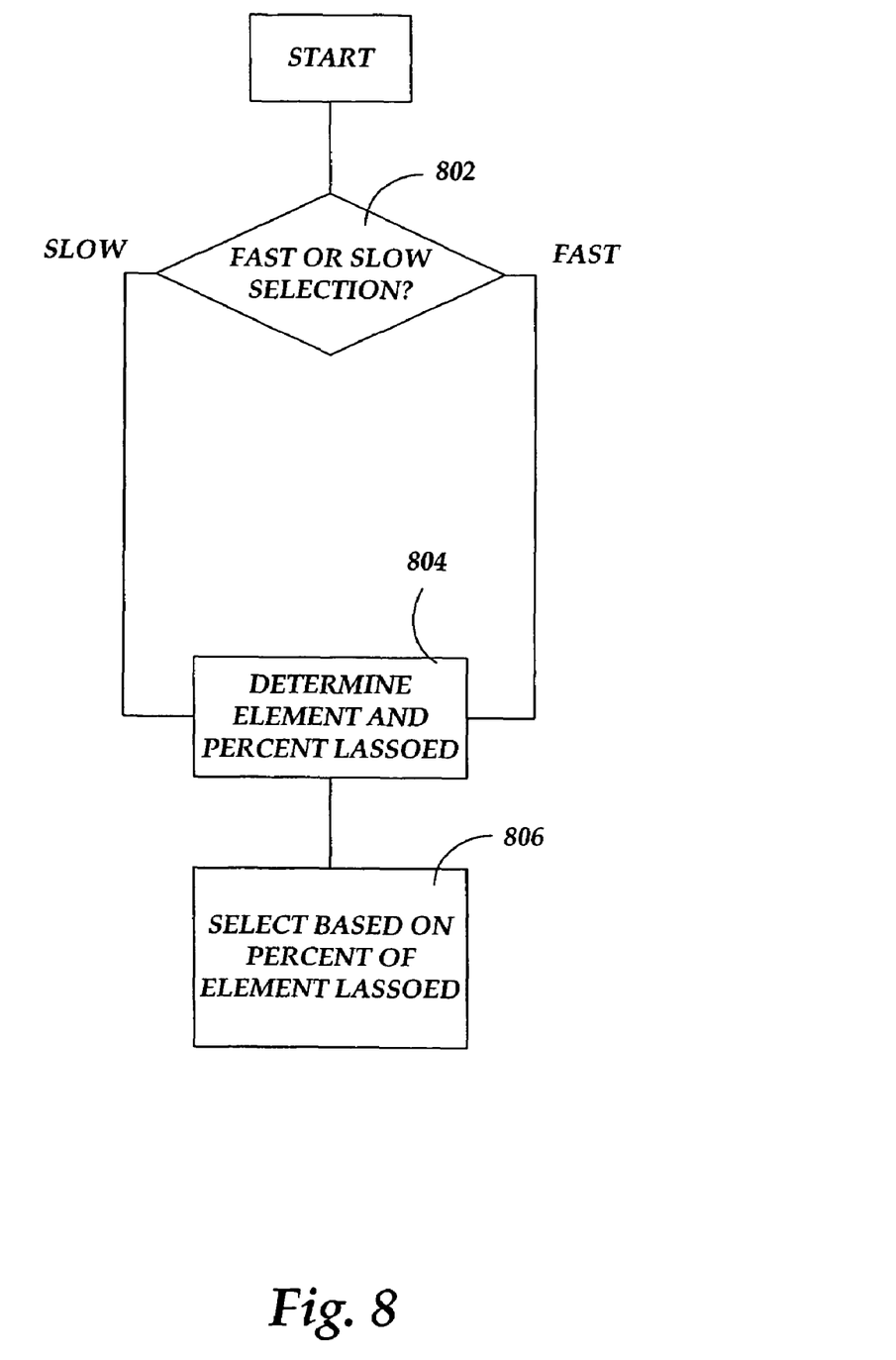
FIG. 8 is a flow diagram illustrating an embodiment of the invention.

Referring to FIG. 8, another embodiment of the invention is described. According to this embodiment, element selection can be based on the velocity or speed of a selection as a user uses the pen to select one or more elements 314 of a document 316. The lasso tool 306 includes a velocity-based selection algorithm 800 which operates to select one or more elements 34 based on the velocity of the user's selection. At 802, the velocity-based selection algorithm 800 first determines whether the user is making a selection at either a slow or fast velocity.

The velocity-based selection algorithm 800 provides the user with real-time feedback and control when making a selection. Preferably, the velocity-based selection algorithm 800 bases the selection velocity on an initial distance as the user makes a selection with the lasso tool 306. Most preferably, the initial selection distance threshold is at least about 1.5 inches. That is, the selection velocity remains "unknown" until the user has traversed at least about 1.5 inches from a start point with the lasso tool 306 while making a selection.

The note-taking application 300 is operable to monitor operations using the pen or other input device. At 802, velocity-based selection algorithm 800 preferably uses a monitored distance and time of a selection to determine whether the user has selected one or more elements 314 with a fast or slow selection velocity. Most preferably, a fast selection velocity is equal to or greater than about 0.02 inches per millisecond and a slow selection velocity is equal to or less than about 0.003 inches per millisecond. The velocity calculation may be made over any distance, but is preferable made over a distance of about three inches to about six inches. It will be appreciated that a particular application programming interface (API) may include functionality to calculate a selection velocity based on different factors and/or inputs.

Tables 1 and 2 below include exemplary selection criteria for selecting one or more elements 314 of a document 316 based on slow and fast selection velocities respectively, according to an embodiment of the velocity-based selection algorithm 800. It will be appreciated that slower selection velocities may be associated with more precise selections. Whereas faster selection velocities may be associated with a less precise selection, when the user is not as interested in finer details of a particular selection, for example. However, it will be appreciated that the precision of the velocity-based selection algorithm 800 may be implemented according to a particular application and preference.

TABLE 1

| Slow velocity Object | % Surrounded |
| --- | --- |
| Any ink stroke | About 90 |
| Handwritten word | No chunk out, default to "Any ink stroke" |
| Handwritten line of text | No chunk out, default to "Any ink stroke" |
| Handwritten paragraph | No chunk out, default to "Any ink stroke" |
| Picture | About 90 |
| Outline | No chunk out, default to "Any ink stroke" |
| Text content of a paragraph | About 75 |
| Text content of a line | About 75 |
| Text word | About 95 |

Thus, if the velocity-based selection algorithm 800 determines that the user's selection of interest is based on a slow selection velocity, at 804 it is determined how much of a particular element 314 has been lassoed by the user. Preferably, at 806 a selection is based upon a percentage that a particular element 314 has been surrounded by the user's lasso. The percentage can be determined based on the user's selection start 320 and end 322 points, when using a pen to select one or more elements 314 of a document 316, for example. As shown in Table 1 above, a basic ink stroke, handwritten word, handwritten line of text, handwritten paragraph, or an outline is selected when a user has surrounded about ninety percent of the particular element 314. A picture is selected when a user has surrounded about ninety percent of the picture. Text content of a paragraph or line is selected when a user has surrounded about seventy-five percent of the element 314. Text content of a word is selected when a user has surrounded about ninety-five percent of the element 314.

TABLE 2

| Fast velocity Object | % Surrounded |
| --- | --- |
| Any ink stroke | About 75 |
| Handwritten word | About 75 |
| Handwritten line | About 90 |
| Handwritten paragraph | About 90 |
| Picture | About 50 |
| Outline | About 90 |
| Text content of a paragraph | About 75 |
| Text content of a line | About 75 |
| Text word | About 75 |

In similar fashion, if the velocity-based selection algorithm 800 determines that the user's selection is based on a fast selection velocity, at 804 it is determined how much of a particular element 314 has been lassoed by the user. At 806 a selection is based upon a percentage of how much of a particular element 314 has been surrounded by the user's lasso. As shown in Table 2 above, a basic ink stroke, handwritten word, text content of a paragraph, line, or word is selected when a user has surrounded about seventy-five percent of the element 314. A handwritten line of text, handwritten paragraph, or an outline is selected when a user has surrounded about ninety percent of the element 314. A picture is selected when a user has surrounded about fifty percent of the picture.

On occasion, a situation may arise when a user's attempt to select one or elements 314 of a document 316 does not result in what the user intended to select. According to an embodiment of the invention, the lasso tool module 202 includes optimization features that operate to recognize and provide a user with accurate selections based on the user's actions using the lasso tool 306. As described above, thresholds (selection percentages, velocities, etc.) may be used to determine whether or not to chunk out a selection. For example, if a user's selection resulted in an unwanted chunk out, the user may attempt a retry to make the selection they want. The lasso tool module 202 is configured to recognize user reselects or retries. Once the lasso tool module 202 determines that the user is attempting a reselect, thresholds are ignored, and only stroke-level selections are used for ink. Slow-velocity thresholds are preferably used for the selection of pictures and text upon a reselect attempt.

Figure 9:
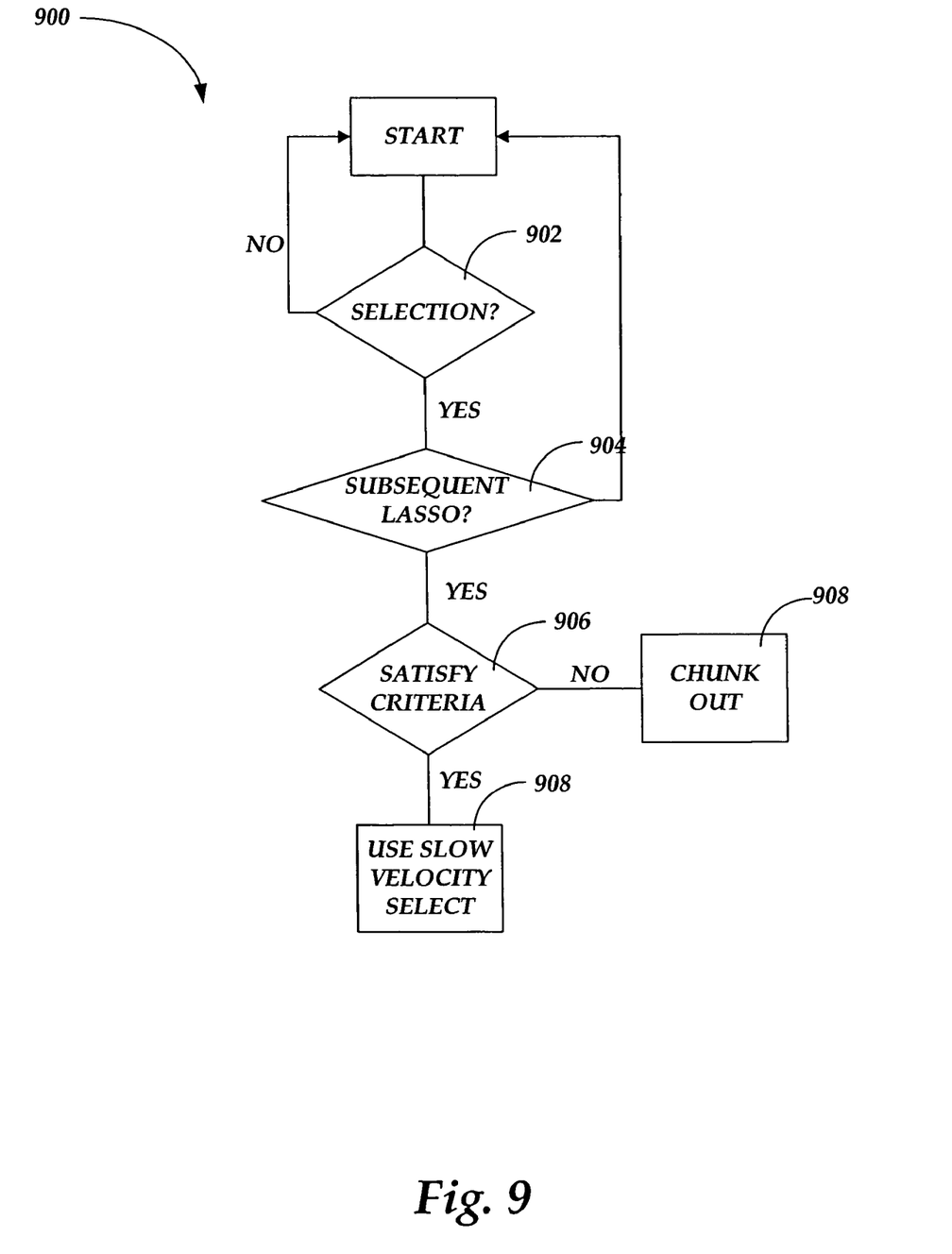
FIG. 9 is flow diagram illustrating another embodiment of the invention.

Referring to FIG. 9, a preferred embodiment of a reselect algorithm 900 of the lasso tool module 202 is described. At 902 the reselect algorithm 900 first determines if a user has attempted to make a selection with the lasso tool 306. If a user has not attempted to make a selection, the reselect algorithm 900 proceeds back to the start of the reselect algorithm 900. In case of a retry attempt, at 904 the reselect algorithm 900 determines whether the user has attempted a subsequent lasso, or has tapped the pen to clear the selection and is attempting another lasso. At 906, if the start point of the subsequent lasso is within about two seconds from stop point of the previous lasso attempt and about one cm from the start point of the previous lasso attempt, then the selection is not chunked out. It will be appreciated that the invention is not intended to be limited by any particular examples or embodiments described herein but is to be measured by the appended claims.

Alternatively, the reselect algorithm 900 can operate to compare a previous lasso path to a subsequent lasso path. If the overlap or common selection area between the paths is greater than about seventy-five percent, the reselect algorithm 900 classifies the subsequent path as a retry. At 908, once the algorithm has classified the lasso as a retry, the reselect algorithm 900 selects out to the stroke level, preferably using the slow velocity % surrounded values of Table 3 above. Otherwise, at 910, the previous selection is chunked out and the reselect algorithm 900 adds the subsequent lasso selection to the first selection.

The lasso tool 306 may also be used in conjunction with the CTRL keys to make multiple-selections. For example, a user can make two lasso selections by holding the CTRL key, making a first lasso selection, and holding down the a CTRL key again to make a second lasso selection, etc. Analogous to using the CTRL key in conjunction with the lasso tool 306, if a user starts another lasso within one second of the previous lasso ending, the application 300 preferably interprets it is as if the CTRL key were being held down. In certain embodiments, multiple selections are resized individually. For example, if there were 3 different selections as the result of a lasso, ctrl-lasso, and another ctrl-lasso, only one of the selections may be resized.

Figure 10:
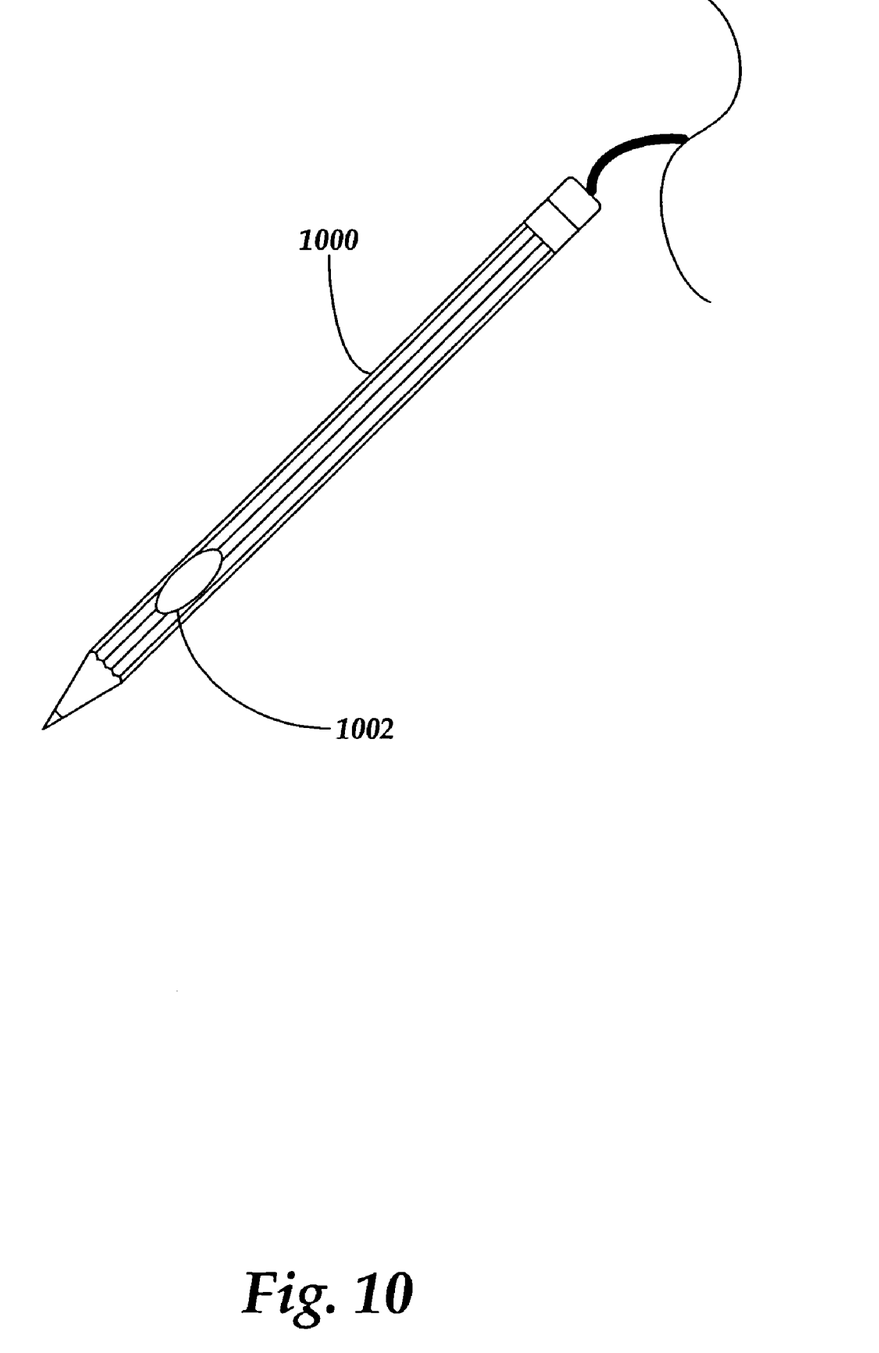
FIG. 10 is an illustration depicting a pen for use with a note-taking application, according to an embodiment of the invention.

Referring now to FIG. 10, a pen 1000 is shown. The pen 1000 includes a barrel button 1002. The barrel button 1002 of the pen 1000 can be used for various operations when using the note-taking application 300. For example, a user can hold down the barrel button 1002 and tap the screen to bring up a context menu. A user may also depress the barrel button 1002 while inking a document 316 to switch it into lasso mode to make a lasso selection. The note-taking application 300 preferably returns to the ink mode when the barrel button 1002 is released. If the user is using the lasso after by selecting the toolbar button, depressing the barrel button 1002 preferably toggles to marquis selection (rectangle/box selection). The user can re-invoke the lasso mode by releasing and depressing the barrel button 1002.

It should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms making up the embodiments of the present invention described herein are referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method of using a free-form selection tool to select one or more elements of an electronic document, the method comprising:
   using a device to indicate a start point of a selection, the start point associated with an element of interest;
   continuing the selection with the device, wherein an indicator provides feedback to a user as to what is being selected;
   monitoring a selection distance traversed from the start point;
   determining a speed of the selection;
   using the speed of the selection to determine an intended selection;
   selecting an element based upon a number of times that an imaginary ray associated with the element crosses the indicator; and
   not selecting the element if the imaginary ray crosses the indicator an even number of times.

2. The method of claim 1, further comprising determining how much of a particular element has been selected based on the monitored distance.

3. The method of claim 2, further comprising selecting the particular element if a certain percentage of the particular element has been surrounded.

4. The method of claim 1, further comprising using an initial selection distance threshold as a basis for the speed determination.

5. The method of claim 1, further comprising selecting an element if the imaginary ray crosses the indicator an odd number of times.

6. The method of claim 1, using the free-form tool to select a single text word, line, or paragraph.

7. The method of claim 1, using the free-form tool to select ink, text, and a picture.

8. A computer-readable medium having computer-readable instructions, which when executed by a computer perform a method of selecting one or more elements of an electronic document, the method comprising:
   indicating a staff point of a selection, the staff point associated with an element of interest,
   continuing the selection and providing a visual indicator of a selection
   determining a speed of the selection;
   using the speed of the selection and other criteria to determine whether to select a particular element;
   selecting an element based upon a number of times that an imaginary ray associated with the element crosses the indicator; and
   not selecting the particular element if the imaginary ray crosses the indicator an even number of times.

9. The computer-readable medium of claim 8, the method further comprising selecting the particular element if a certain percentage of the particular element has been surrounded.

10. The computer-readable medium of claim 8, the method further comprising recognizing whether a selection is a retry.

11. The computer-readable medium of claim 8, the method further comprising using the free-form tool to select a single text word, line, or paragraph.

12. A system including a free-form selection tool for making element selections associated with an electronic document, the system comprising:
   a memory storage; and
   a processing unit coupled to the memory storage, wherein the processing unit is operative to:
   indicate a start point of a selection, the start point associated with an element of interest, wherein a device is used to continue the selection,
   monitor a selection distance associated with the start point,
   determine a particular selection based at least in part on whether a user is performing a retry operation,
   analyzes a number of times that an imaginary ray associated with the element crosses a selection indicator; and
   not selecting the element if the imaginary ray crosses the indicator an even number of times.

13. The system of claim 12, wherein the processing unit being operative to determine the particular selection comprises the processing unit being operative to utilizes a selection speed as part of a selection determination.

14. The system of claim 13, wherein the processing unit being operative to determine the particular selection comprises the processing unit being operative to utilizes a percentage based selection criteria as part of the determination.

15. The system of claim 12, wherein the processing unit being operative to determine the particular selection comprises the processing unit being operative to recognize a retry operation by comparing first and second selection start points and a time between the first and second selections.

16. The system of claim 12, wherein the processing unit being operative to determine the particular selection comprises the processing unit being operative to determine a retry operation by comparing an amount of overlap between a first and a second selection.

* * * * *